Nov. 27, 1928.

C. H. DIETZE, JR 1,693,140

RATTLE

Filed April 9, 1928

INVENTOR
Carl H. Dietze, Jr.,
BY
Wm H. Caufield,
ATTORNEY.

Patented Nov. 27, 1928.

1,693,140

UNITED STATES PATENT OFFICE.

CARL H. DIETZE, JR., OF NEWARK, NEW JERSEY.

RATTLE.

Application filed April 9, 1928. Serial No. 268,459

This invention relates to an improved rattle that is highly resonant, and that is light in weight and that can be easily and quickly assembled.

To this end the rattle is composed of a box-like casing and a spindle including a handle and ratchet which spindle is readily inserted in the casing and is then in position for cooperating with a lip in the bottom of the casing, and also a lid which serves to hold the spindle in position and is itself held in place by the resiliency of the box.

Figure 1:
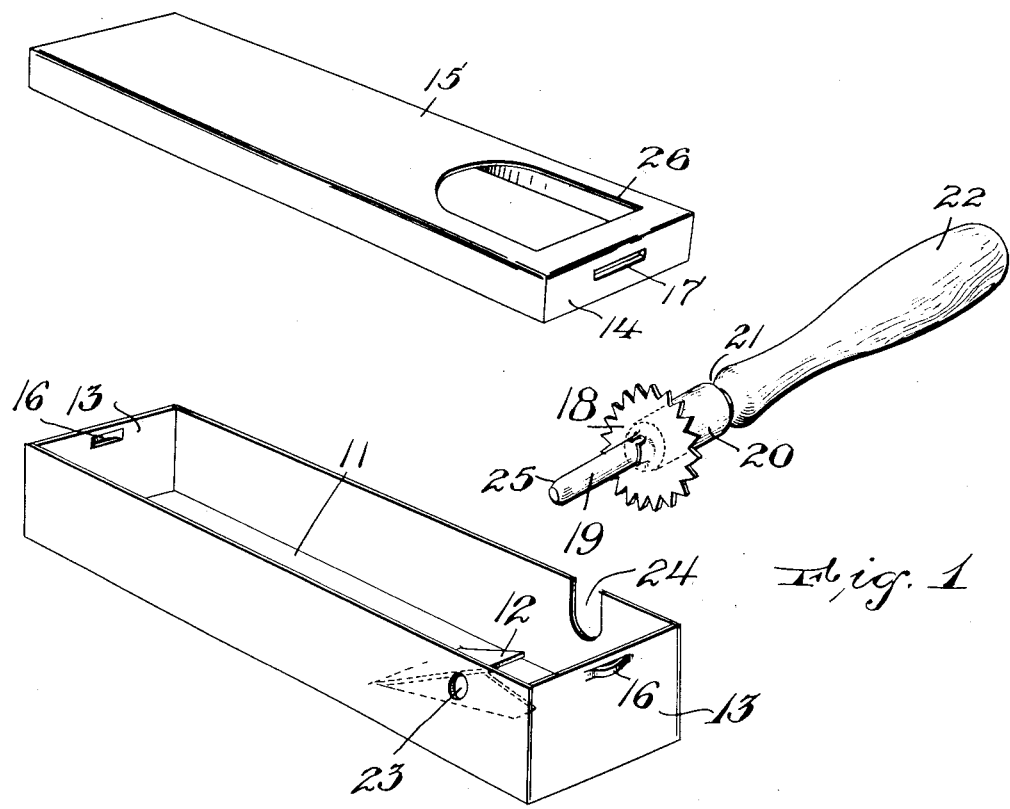
Figure 2:
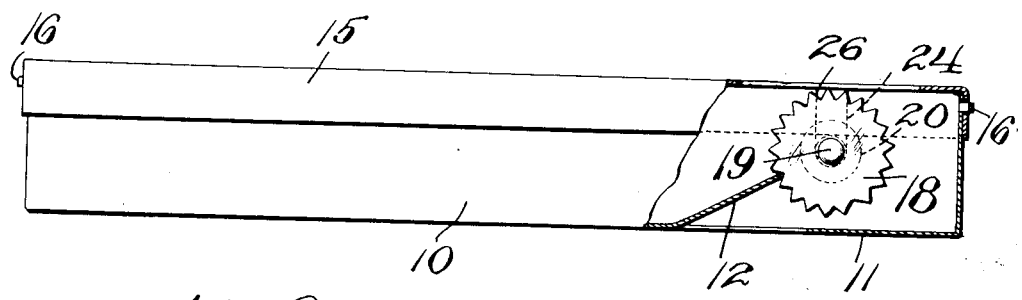

The invention is illustrated in the accompanying drawings, in which Figure 1 is a perspective view of the box with the parts separated and Figure 2 is a side view of the rattle with part of the box and lid shown in section.

The box-like casing 10 is formed of thin sheet metal, usually tin, to provide a sounding board or resonant part at the bottom 11 when the lip 12 is vibrated by a ratchet. The box 11 has the sides struck up from the same blank as the bottom and the ends 13 are slightly resilient so that they act to yieldingly hold the flanges 14 of the lid 15. The lid is also of sheet metal and the means for holding the lid is illustrated as projections 16 struck up on the flanges 13 and projecting through the openings 17 of the flanges 14 when the inward pressure by the fingers on the ends 13 is relaxed after the lid is on. An inward pressure on these ends 13 will, of course, release the projections 16 to allow the lid to be removed.

The ratchet 18 is mounted on the spindle 19 and rests against a shoulder formed by the larger part 20 of the spindle. The larger part 20 has a groove 21 in it and beyond the groove is the handle 22.

In the side walls of the box 10 are openings to serve as bearings for the spindle and at least one of these openings extends to the top of the box in the form of a slot. In the form illustrated one of the openings is the hole 23 and the other one is a slot 24.

When the parts are to be assembled the end 25 of the spindle, which end is usually slightly tapered, is put through the opening 23 and the grooved part 21 is then placed in the slot 24 and is thereby held against longitudinal movement. The ends 13 are pushed, the cover is put on and the ends 13 released. The assembly is now complete.

The lip 12 is preferably arranged radially relative to the bearings of the spindle, such as the hole 23, so that the teeth of the ratchet 18 will freely vibrate the lip 12 no matter in which direction the rattle is swung with a circular motion.

The lid has an opening 26 so that the ratchet is accessible and can be sounded by a finger to provide a staccato effect or establish a rhythm such as providing a marching time.

Changes can be made in the forms of the various parts without departing from the invention.

I claim:

1. A rattle comprising a box-like casing with a lid thereon, a handle with a ratchet insertible and removable laterally of the casing and rotatable therein, and a lip on the casing with which the ratchet engages the lid on the casing having flanges to hold the handle in place.

2. A rattle comprising a sheet metal box-like casing with a lip struck up from the bottom and having opposed openings, at least one of said openings being a slot, a spindle fitting in the openings and including a handle beyond the casing, a ratchet on the spindle to engage the lip, and a lid to close the box and having flanges to engage the spindle to hold it in place.

3. A rattle comprising a sheet metal box-like casing with a lip struck up from the bottom and having opposed openings at least one of said openings being a slot, a spindle fitting in the openings and including a handle beyond the casing, a ratchet on the spindle to engage the lip, and a lid to close the box and having flanges to engage the spindle to hold it in place, the lid having an opening to allow direct rotation of the ratchet by the finger.

4. A rattle comprising a sheet of metal formed into a box with its ends somewhat resilient and a lid with flanges, the end flanges of the lid and the ends of the box having cooperating means to hold the lid on, by the resiliency of said ends, one side wall of the casing having a hole therein, the other side wall having a slot therein, a spindle with a reduced end to enter the hole and having a larger part to form a shoulder, a ratchet secured to said spindle and against the shoulder, the shoulder having a groove to receive the edge of the slot, an integral lip struck up from the bottom of the box and radial relative to the hole for the spindle, and a handle on the end of the spindle.

In testimony whereof I affix my signature.

CARL H. DIETZE, Jr.